R. C. HUEY.
GRAFTING.
APPLICATION FILED JUNE 27, 1910.
971,536.
Patented Oct. 4, 1910.
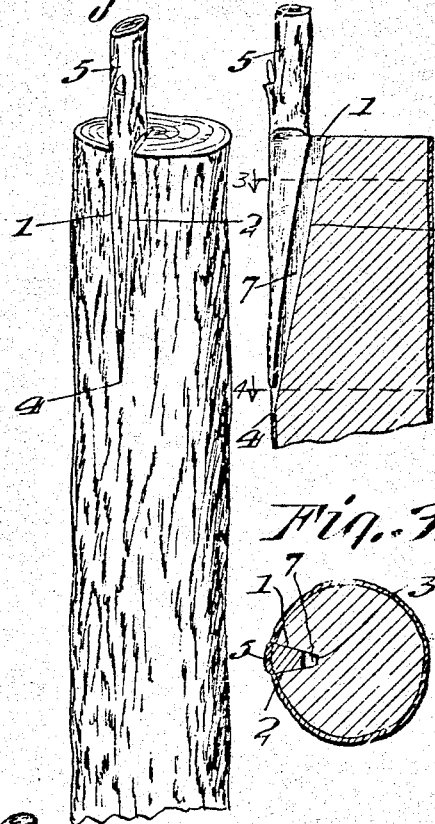
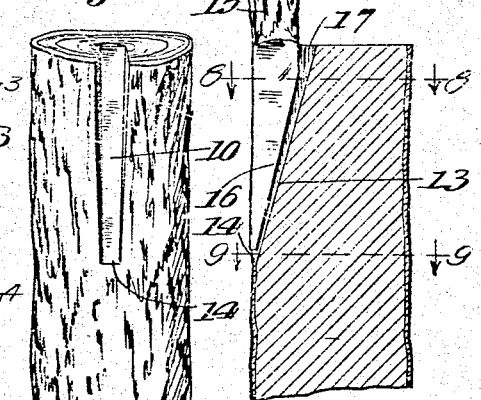
Witnesses
E. B. Brown
Perry Pattison
Inventor
Robert C. Huey
by J. B. Leralli
Attorney

UNITED STATES PATENT OFFICE.

ROBERT C. HUEY, OF HORTONS, PENNSYLVANIA.

GRAFTING.

971,536.      Specification of Letters Patent.      Patented Oct. 4, 1910.

Application filed June 27, 1910. Serial No. 569,092.

*To all whom it may concern:*

Be it known that I, ROBERT C. HUEY, a citizen of the United States, residing at Hortons, in the county of Indiana and State of Pennsylvania, have invented new and useful Improvements in Grafting, of which the following is a specification.

This invention relates to certain new and useful improvements in grafting and relates more particularly to grafting of trees and similar growths.

The object of the invention is to provide an improved means of forming the graft lock or joint between the scion and the stock.

The invention further aims to provide a joint or lock of this type which will be simple and susceptible of being formed without the aid of special tools or appliances.
Further and other objects will later appear and be set forth.

In the drawings:—Figure 1 is a view in perspective of the invention. Fig. 2 is a fragmentary vertical sectional view of Fig. 1, Fig. 3 is a transverse section on the line 3—3 of Fig. 2, Fig. 4 is a similar view on the line 4—4 of Fig. 2, Fig. 5 is a perspective view of the stock. Fig. 6 is a front elevation of the scion, as used in a modified form of the invention. Fig. 7 is a view similar to Fig. 2 of a slight modification, Fig. 8 is a transverse section on the line 8—8 of Fig. 7, Fig. 9 is a similar view on the line 9—9 of Fig. 7, and Fig. 10, is a perspective view of the scion employed in the modified form.

The stock is depicted in the drawings as being formed with a cleft which tapers from top to bottom, the cleft being formed of two side walls 1 and 2 which form a V-shaped space between them. The rear wall 3 inclines downwardly until it meets the walls 1 and 2 at a common point 4. It will be seen that the walls 1 and 2 form a V-shaped space in front elevation and in cross section form a wedge shaped or a V-shaped space as well. The scion 5 in front elevation is of V-shape and in its transverse section is shaped to be conformably received in the cleft, the front side of the scion, as shown in the drawings, lying flush with the bark of the tree or the like and its rear face or side being arranged in spaced relation to the wall 3 provided by the cleft so as to provide a passage or channel 7 which at one end communicates with the atmosphere at the top of the stock and its opposite end communicates with the atmosphere at points between the lowest end of the scion and the lowest end of the cleft in the stock.

In the modified form of the invention the cleft 10 in cross section has its walls 11 and 12 at a less acute angle to each other than in the other form of the invention. The rear wall 13 tapers in a manner agreeing with that of the rear wall 3 in the preferred form. It will be noted however, that in this form of the invention the walls 11 and 12 in front elevation do not incline to a sharp point as in the preferred form, but on the contrary meet at a bottom wall 14 which is of slightly less width than the distance between the upper end of the walls 11 and 12. The scion 15 as depicted in the drawings is shaped in this form of the invention to be conformably received in the cleft 10 and has its rear side 16 spaced from the rear wall 13 of the cleft so as to form a passage or channel 17 which extends from the top of the stock to the wall 14.

It will be understood that in practice grafting wax is used as is common. It will be seen that a neat joint is thus provided and one which is extremely efficient in practice. The scion is inserted into the cleft of the stock by placing the lower end of the scion in the cleft, and then moving the entire scion downwardly, wedging its walls into engagement with the walls of the cleft, thereby forming a neat, secure and accurate union between the stock and the scion.

As is well known, the sap flows at points between the under side of the bark and the periphery of the tree body. By reference to Figs. 3 and 8 of the present case it will be seen that the cleft and the stock are so proportioned that the bark on the scion and stock accurately and truly registers throughout the length of the scion, thus placing the sap receptive points of the scion in circuit as it were with the points at which the sap flows in the stock, which is a feature of great importance and advantage since it thus places the scion in position where it receives the greatest nourishment and benefit from the sap of the stock. Thus the sap will course from the stock through the scion both transversely and longitudinally of the latter.

What is claimed as new is:

1. A graft lock or joint consisting in combination with a stock having a cleft composed of a rear wall and two side walls which latter form a space therebetween of V-shape in cross section and V-shape in front elevation, a scion conformably fitted in the cleft and having a passage between its near side and the rear wall of the cleft, said passage communicating with the atmosphere at the top of the stock.

2. A graft lock comprising in combination with a stock having a cleft composed of a rear wall which inclines from a point at the top of the stock and beyond the periphery thereof, downwardly to extend through the periphery of the stock, and two side walls which form a space therebetween of V-shape in cross section and in front elevation, a scion conformably fitted in the cleft and having its rear wall spaced from the rear wall of the cleft to form a passage between the rear wall of the cleft and the rear wall of the scion.

3. A graft lock comprising in combination with a stock formed with a cleft composed of a rear wall and two side walls, a scion conformably fitted in the cleft and having a rear wall which is spaced from the rear wall of cleft whereby a passage is formed between the cleft and the stock at the rear wall of the scion.

In testimony whereof I have hereunto set my hand in presence of two subscribing witnesses.

ROBERT O. HUEY.

Witnesses:
IDA G. MURRAY,
EVON E. RUFFNER.